United States Patent
Liu (10) Patent No.: US 12,155,603 B2
(45) Date of Patent: Nov. 26, 2024

(54) DATA TRANSMISSION METHODS AND APPARATUSES, AND STORAGE MEDIA

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 355 days.

(21) Appl. No.: 17/637,041

(22) PCT Filed: Aug. 30, 2019

(86) PCT No.: PCT/CN2019/103856
§ 371 (c)(1),
(2) Date: Feb. 21, 2022

(87) PCT Pub. No.: WO2021/035734
PCT Pub. Date: Mar. 4, 2021

(65) Prior Publication Data
US 2022/0345280 A1    Oct. 27, 2022

(51) Int. Cl.
*H04L 5/00* (2006.01)
(52) U.S. Cl.
CPC .......... *H04L 5/0092* (2013.01); *H04L 5/0007* (2013.01)
(58) Field of Classification Search
CPC ... H04L 5/0092; H04L 5/0007; H04L 5/0094; H04L 5/0023; H04W 72/0446; H04W 72/0453; H04W 72/23; H04W 72/21; H04W 72/044; H04W 72/02
See application file for complete search history.

(56) References Cited

U.S. PATENT DOCUMENTS

| 2018/0098339 | A1 | 4/2018 | Miao |
| 2019/0103947 | A1 | 4/2019 | Park |
| 2019/0149213 | A1 | 5/2019 | Zhou et al. |
| 2019/0268883 | A1* | 8/2019 | Zhang .................. H04L 5/0094 |
| 2020/0178252 | A1* | 6/2020 | Li ......................... H04W 72/04 |

(Continued)

FOREIGN PATENT DOCUMENTS

| CN | 101720131 A | 6/2010 |
| CN | 108513356 A | 9/2018 |
| CN | 109302718 A | 2/2019 |

(Continued)

OTHER PUBLICATIONS

International Search Report of the International Application No. PCT/CN2019/103856 dated May 26, 2020 with English translation, (4p).

(Continued)

*Primary Examiner* — Dady Chery
(74) *Attorney, Agent, or Firm* — Arch & Lake LLP; Hao Tan; Zhangyuan Ji (57) ABSTRACT

A data transmission method. The method is performed by a base station and includes: sending bandwidth part (BWP) configuration information to a terminal, wherein the BWP configuration information includes time domain indication information for indicating time domain resources enabled by the BWP configuration information; and performing a data transmission with the terminal on the time domain resources indicated by the time domain indication information.

16 Claims, 4 Drawing Sheets

(56) References Cited

U.S. PATENT DOCUMENTS

2021/0235440 A1* 7/2021 Liang .................... H04W 72/21

FOREIGN PATENT DOCUMENTS

| CN | 109474375 A | 3/2019 |
|---|---|---|
| CN | 109600212 A | 4/2019 |
| CN | 109788553 A | 5/2019 |
| CN | 109802778 A | 5/2019 |
| CN | 109831827 A | 5/2019 |
| CN | 109995497 A | 7/2019 |
| CN | 110115066 A | 8/2019 |
| CN | 110167167 A | 8/2019 |
| WO | 2016179805 A1 | 11/2016 |

OTHER PUBLICATIONS

Samsung. "On Bandwidth Part Operation" 3GPP TSG RAN WG1 NR 90bis, R1-1717675, Oct. 13, 2017 (Oct. 13, 2017), entire document, (8 pages).

State Intellectual Property Office of the People's Republic of China, Office Action and Search Report Issued in Application No. 2019800018627, May 24, 2023, 20 pages.(Submitted with Machine/Partial Translation).

State Intellectual Property Office of the People's Republic of China, Office Action and Search Report Issued in Application No. 2019800018627, Oct. 14, 2022, 21 pages. (Submitted with Machine/Partial Translation), (21p).

ISA State Intellectual Property Office of the People's Republic of China, Written Opinion of the International Searching Authority Issued in Application No. PCT/CN2019/103856, May 26, 2020, WIPO, 7 pages.

State Intellectual Property Office of the People's Republic of China, Office Action and Search Report Issued in Application No. 2019800018627, Oct. 14, 2022, 21 pages. (Submitted with Machine/Partial Translation), (7p).

Samsung, "RRM measurement configuration for Bwp", 3GPP TSG-RAN WG2 NR #101b Meeting Sanya, China, Apr. 16-20, 2018, R2-1805849 (Update of R2-1802466), (5p).

* cited by examiner

DATA TRANSMISSION METHODS AND APPARATUSES, AND STORAGE MEDIA

CROSS-REFERENCE TO RELATED APPLICATION

This application is the U.S. national phase application of International Application No. PCT/CN2019/103856, filed on Aug. 30, 2019, the disclosure of which is incorporated herein by reference in its entirety for all purposes.

TECHNICAL FIELD

The present disclosure relates to the field of wireless communication technology, and in particular, relates to a data transmission method and apparatus, and a storage medium.

BACKGROUND

Bandwidth Part (BWP) is introduced by New Radio (NR) standards in wireless communication technologies so as to better support terminals that are unable to handle the entire carrier bandwidth and to better support reception bandwidth adaptation functions.

When connected to a network, a terminal may be configured with up to 4 downlink BWPs and up to 4 uplink BWPs. At any certain moment, only one configured BWP is activated. The configured BWP is a fixed number of continuous physical resource blocks (PRBs) determined by high-layer parameters.

SUMMARY

The present disclosure provides a data transmission method and apparatus, and a storage medium. The technical solutions are as follows.

According to a first aspect of the present disclosure, a data transmission method is provided. The method is performed by a base station and includes sending bandwidth part (BWP) configuration information to a terminal, wherein the BWP configuration information includes time domain indication information for indicating time domain resources enabled by the BWP configuration information. The method further includes performing a data transmission with the terminal on the time domain resources indicated by the time domain indication information.

According to a second aspect of the present disclosure, a data transmission method is provided. The method is performed by a terminal and includes receiving bandwidth part (BWP) configuration information from a base station, wherein the BWP configuration information includes time domain indication information for indicating time domain resources enabled by the BWP configuration information. The method further includes performing a data transmission with the base station on the time domain resources indicated by the time domain indication information.

According to a third aspect of the present disclosure, a data transmission apparatus is provided. The apparatus is configured in a terminal and includes one or more processors; and a memory for storing instructions executable by the one or more processors. The one or more processors are configured to receive bandwidth part (BWP) configuration information from a base station, wherein the BWP configuration information includes time domain indication information for indicating time domain resources enabled by the BWP configuration information. The one or more processors are further configured to perform a data transmission with the base station on the time domain resources indicated by the time domain indication information.

It should be understood that the above general description and the following detailed description are only illustrative, and are not intended to limit the present disclosure.

BRIEF DESCRIPTION OF THE DRAWINGS

The drawings related to the description of the examples will be briefly introduced to explain the technical solutions provided by examples of the present disclosure more clearly. It is obvious that, the drawings in the following description illustrate only some examples of the present disclosure, and based on these drawings, those of ordinary skill in the art may obtain other drawings without creative work.

DETAILED DESCRIPTION

Embodiments will be described in detail here with the examples thereof expressed in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

It should be understood that if mentioned in this text, the word "several" refers to one or more, and the word "plurality" refers to two or more. The word "and/or" is an association relationship for describing associated objects, and indicates that there may be three relationships, for example, A and/or B may indicate that there are three cases: A alone, A and B, and B alone. The character "/" generally indicates a relationship of "or" between the front and back associated objects.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

With the development of wireless communication technology, mobile data is growing rapidly. In order to meet the communication requirement of the rapidly growing mobile data, researches on two-step random access standardization have been conducted in the fifth-generation (5G) mobile communication technology, which also known as new radio (NR) technology.

Figure 1:
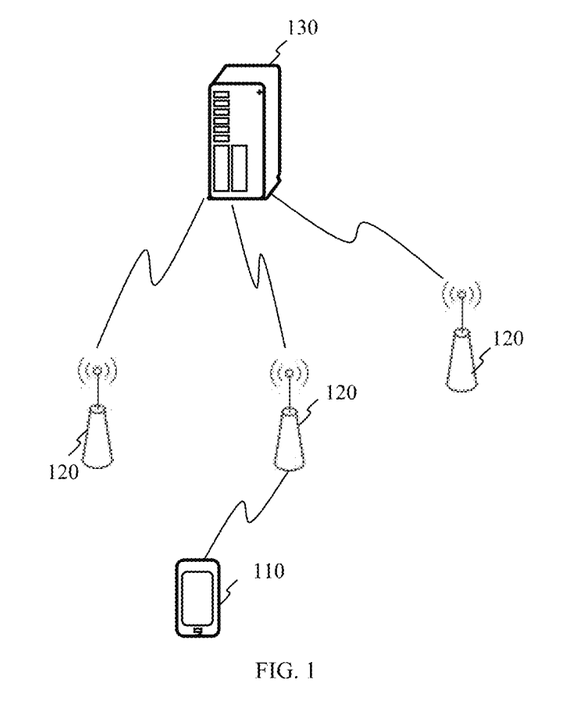
FIG. 1 is a schematic structural diagram of a wireless communication system provided by examples of the present disclosure.

Please refer to FIG. 1, which illustrates a schematic structural diagram of a wireless communication system provided by examples of the present disclosure. As illustrated in FIG. 1, the mobile communication system is a communication system based on a cellular mobile communication technology, and the mobile communication system may include several terminals 110 and several base stations 120.

The terminal 110 may refer to a device that provides voice and/or data connectivity for a user. The terminal 110 may communicate with one or more core networks via a radio access network (RAN). The terminal 110 may be an Internet of Things terminal, such as a sensor device, a mobile phone (or called a "cellular" phone), or a computer equipped with the Internet of Things terminal, which may be a fixed, portable, pocket-sized, handheld, computer-built-in or vehicle-mounted device as an instance. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Or, the terminal 110 may be a device like an unmanned drone.

The base station 120 may be a device at a network side in the wireless communication system. The wireless communication system may be a 5G system, also known as a new radio (NR) system. Alternatively, the wireless communication system may be a next-generation system of the 5G system.

The base station 120 may be a Node-B (gNB) adopting a centralized and distributed architecture in the 5G system. When adopting the centralized and distributed architecture, the base station 120 usually includes a central unit (CU) and at least two distributed units (DUs). The central unit is provided with protocol stacks on a packet data convergence protocol (PDCP) layer, a radio link control (RLC) protocol layer, and a media access control (MAC) layer. The distributed unit is provided with protocol stacks on a physical (PHY) layer. The examples of the present disclosure do not limit the specific implementation of the base station 120.

A wireless connection may be established between the base station 120 and the terminal 110 through a wireless air interface. In different implementations, the wireless air interface is based on the fifth-generation mobile communication network technology (5G) standards, for example, the wireless air interface is a new radio. Alternatively, the wireless air interface may be based on next-generation mobile communication network technology standards of 5G.

In one or more examples, the foregoing wireless communication system may further include a network management device 130.

Several base stations 120 can be connected to the network management device 130 respectively. The network management device 130 may be a core network device in the wireless communication system. For example, the network management device 130 may be a mobility management entity (MME) in an evolved packet core (EPC) network. Alternatively, the network management device may be another core network device, such as a serving gateway (SGW), a public data network gateway (PGW), a policy and charging rules function (PCRF) unit or a home subscriber server (HSS). The implemented forms of the network management device 130 are not limited by the examples of the present disclosure.

5G technology is applied in very wide scenarios. In many scenarios, a large number of terminals with low performance are required. Therefore, the low-cost terminal has become one of the important topics in 5G study.

Currently, there have been several consensuses on the low-cost terminal. The first one is the terminal has fewer antennas supported with simplified MIMO functions, the second one is the terminal has low transmission power, the third one is the peak throughput of the terminal is not high, the fourth one is that the bandwidth which the terminal supports is non-wideband, etc.

In the above consensuses, either the fewer antennas with simplified MIMO functions or lower transmission power affects an uplink coverage of a system greatly (however, these affect a downlink coverage limitedly). Overall, for the low-cost terminal, the gap between the uplink coverage and the downlink coverage is up to about 10 dB. Therefore, if the uplink coverage problem is not solved, the operators have to increase their investment, or the working range of the low-cost terminal will be limited, which causes the low-cost terminal incompatible with the standards. One of the effective means to solve the uplink coverage problem of the low-cost terminal is Bandwidth Part (BWP).

A reception bandwidth adaption technology has been introduced during designing of the NR standards since a larger carrier bandwidth needs to be supported in the NR system. Through the reception bandwidth adaption technology, the terminal monitors downlink control channels on a smaller bandwidth and receives a small amount of downlink data transmission, but opens the entire bandwidth for reception upon a large amount of data needs to be received by the terminal. The Bandwidth Part (BWP) is defined in the NR standards, so as to better support terminals that are unable to handle the entire carrier bandwidth and to be compatible with bandwidth adaptation functions. A BWP delimits a group of continuous resource blocks starting from a certain position of a common resource block. In addition, each BWP may correspond to a parameter set, and the parameter set may include Sub-Carrier Spacing (SCS) and Cyclic Prefix (CP) length, etc.

In a sense, the BWP may be regarded as a working bandwidth of the terminal. By performing a BWP configuration for the terminal, the following functions can be achieved.

1) To provide support for the terminal in which a bandwidth supported by its receiver (such as 20 MHz) is less than the entire system bandwidth (such as 100 MHz).
2) To reduce a power consumption of the terminal by switching and adapting between BWPs with different bandwidth sizes.
3) To switch the parameter sets of an air interface by changing the BWP of the terminal.
4) To optimize a utilization of wireless resources according to need and reduce interference between systems.
5) To be able to configure non-continuous frequency bands in the carrier.
6) To be able to reserve frequency bands in the carrier to support undefined transmission formats.

In some scenarios in which the BWP is supported, the terminal obtains a control resource set (CORESET) through a physical broadcast channel (PBCH) when it enters into a connected state. Through the CORESET, the terminal can find control channel information for scheduling remaining system information. The CORESET is obtained from the PBCH and an initial downlink BWP is activated. An initial uplink BWP is obtained from the system information scheduled by the downlink physical downlink control channel (PDCCH).

After being connected to a network, the terminal can be configured with up to 4 downlink BWPs and up to 4 uplink BWPs in every serving cell. At any certain moment, only one configured downlink BWP is in the activated state, and only one configured uplink BWP is in the activated state.

In a possible implementation, after a terminal accesses a base station, the system configures one or more suitable BWPs for the terminal by sensing the terminal's traffic. At this time, the base station may send BWP configuration information to the terminal. The BWP configuration information instructs the terminal to switch to one of a plurality of configured BWPs.

In addition, the system also defines the number of continuous physical resource blocks (PRB) corresponding to one BWP through high-layer signaling other than the BWP configuration information. For example, the system may define the number of continuous PRBs corresponding to one BWP through the high-layer signaling "locationAndBandWidth". The information in the "locationAndBandWidth" can be regarded as a resource indication value (RIV). Normally, the RIV may be set to 275. In other words, one BWP corresponds to 275 continuous PRBs.

Apart from the above "locationAndBandWidth", the system may also define the parameter set corresponding to the BWP through high-layer signaling, for example, define the subcarrier spacing of the BWP through "subcarrierSpacing" and define the cyclic prefix of the BWP through "cyclicPrefix".

However, in the above-mentioned BWP configuration schemes, the BWP configuration information only indicates the BWP to which the terminal is expected to be switched, while time domain information of various BWPs, which is indicated by another high-layer signaling, is fixed and continuous in time domain, which results in a lack of BWP configuration flexibility and affects the utilization of system resources.

Examples of the present disclosure provide a data transmission method. Please refer to FIG. 2, which illustrates a flowchart of the data transmission method provided by the examples of the present disclosure. The data transmission method is applicable to the wireless communication system illustrated in FIG. 1 and performed by the base stations in FIG. 1. The method may include the following steps.

Figure 2:
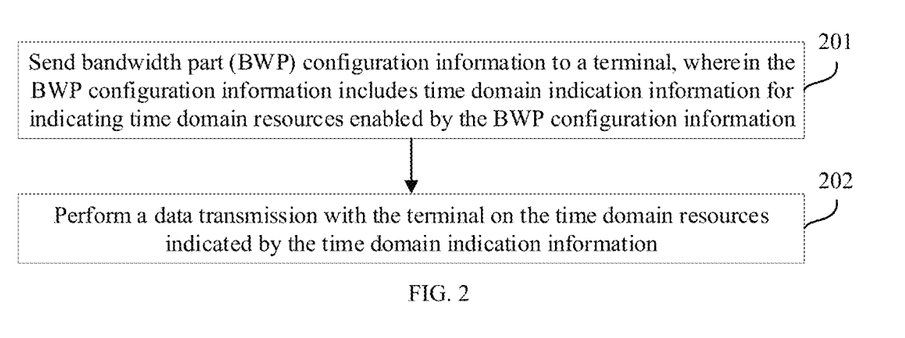
FIG. 2 is a flowchart of a data transmission method provided by examples of the present disclosure.

At step 201, bandwidth part (BWP) configuration information is sent to a terminal, wherein the BWP configuration information includes time domain indication information for indicating time domain resources enabled by the BWP configuration information.

At step 202, a data transmission is performed with the terminal on the time domain resources indicated by the time domain indication information.

In an example, the BWP configuration information further includes frequency domain indication information for indicating one or more BWPs of the terminal.

And, the step that the data transmission is performed with the terminal on the time domain resources indicated by the time domain indication information includes that:
the data transmission is performed with the terminal on time-frequency resources indicated by both the frequency domain indication information and the time domain indication information.

In an example, the time domain resources indicated by the time domain indication information is non-continuous; or
the time domain resources indicated by the time domain indication information are continuous.

In an example, a minimum time domain unit of the time domain resources indicated by the time domain indication information is an orthogonal frequency division multiplexing (OFDM) symbol.

In an example, the time domain indication information is on a first level of the BWP configuration information.

In an example, the frequency domain indication information includes an identifier of a target bandwidth part. The target bandwidth part is one of at least two bandwidth parts pre-configured for the terminal.

In an example, the step that the BWP configuration information is sent to the terminal includes that:
the BWP configuration information is sent to the terminal through radio resource control (RRC) signaling; or
the BWP configuration information is sent to the terminal through downlink control information (DCI).

In an example, the step that the data transmission is performed with the terminal on the time domain resources indicated by the time domain indication information includes that:
uplink data transmitted by the terminal is received on the time domain resources indicated by the time domain indication information when the BWP configuration information is used to configure an uplink BWP of the terminal; and
downlink data is transmitted to the terminal on the time domain resources indicated by the time indicated by indication information when the BWP configuration information is used to configure a downlink BWP of the terminal.

In view of the above, through the solutions illustrated in the examples of the present disclosure, the BWP configuration information sent by the base station to the terminal includes the time domain indication information, and in subsequent data communication, the base station performs the data transmission with the terminal on the time domain resources indicated by the time domain indication information. Thereby, it achieves that one or more BWPs of the terminal is flexibly configured in time domain through the BWP configuration information, and avoids a lack problem of BWP configuration flexibility due to time domain information of each BWP of the terminal being fixed and being configured continuously in time domain, which improves a utilization of system resources.

Figure 3:
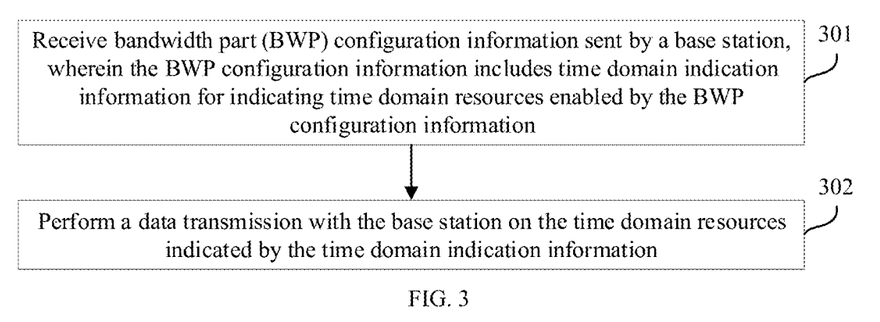
FIG. 3 is a flowchart of a data transmission method provided by examples of the present disclosure.

Please refer to FIG. 3, which illustrates a flowchart of a data transmission method provided by examples of the present disclosure. The data transmission method is applicable to the wireless communication system illustrated in FIG. 1 and performed by the terminal in FIG. 1. The method may include the following steps.

At step 301, bandwidth part (BWP) configuration information sent by a base station is received, wherein the BWP configuration information includes time domain indication information for indicating time domain resources enabled by the BWP configuration information.

At step 302, a data transmission is performed with the base station on the time domain resources indicated by the time domain indication information.

In an example, the BWP configuration information further includes frequency domain indication information for indicating one or more BWPs of the terminal.

And, the step that the data transmission is performed with the base station on the time domain resources indicated by the time domain indication information includes that:

the data transmission is performed with the base station on time-frequency resources indicated by both the frequency domain indication information and the time domain indication information.

In an example, the time domain resources indicated by the time domain indication information is non-continuous; or the time domain resources indicated by the time domain indication information are continuous.

In an example, a minimum time domain unit of the time domain resources indicated by the time domain indication information is an orthogonal frequency division multiplexing (OFDM) symbol.

In an example, the time domain indication information is on a first level of the BWP configuration information.

In an example, the frequency domain indication information includes an identifier of a target bandwidth part. The target bandwidth part is one of at least two bandwidth parts pre-configured for the terminal.

In an example, the step that the BWP configuration information sent by the base station is received includes that:

the BWP configuration information that is sent by the base station through radio resource control (RRC) signaling is received; or the BWP configuration information that is sent by the base station through downlink control information (DCI) is received.

In an example, the step that the data transmission is performed with the base station on the time domain resources indicated by the time domain indication information includes that:

uplink data is transmitted to the base station on the time domain resources indicated by the time domain indication information when the BWP configuration information is used to configure an uplink BWP of the terminal; and downlink data transmitted by the base station is received on the time domain resources indicated by the time domain indication information when the BWP configuration information is used to configure a downlink BWP of the terminal.

In view of the above, through the solutions illustrated in the examples of the present disclosure, the BWP configuration information received by the terminal from the base station includes the time domain indication information, and in subsequent data communication, the terminal performs the data transmission with the base station on the time domain resources indicated by the time domain indication information. Thereby, it achieves that one or more BWPs of the terminal is flexibly configured in time domain through the BWP configuration information, and avoids a lack problem of BWP configuration flexibility due to time domain information of each BWP of the terminal being fixed and being configured continuously in time domain, which improves a utilization of system resources.

Figure 4:
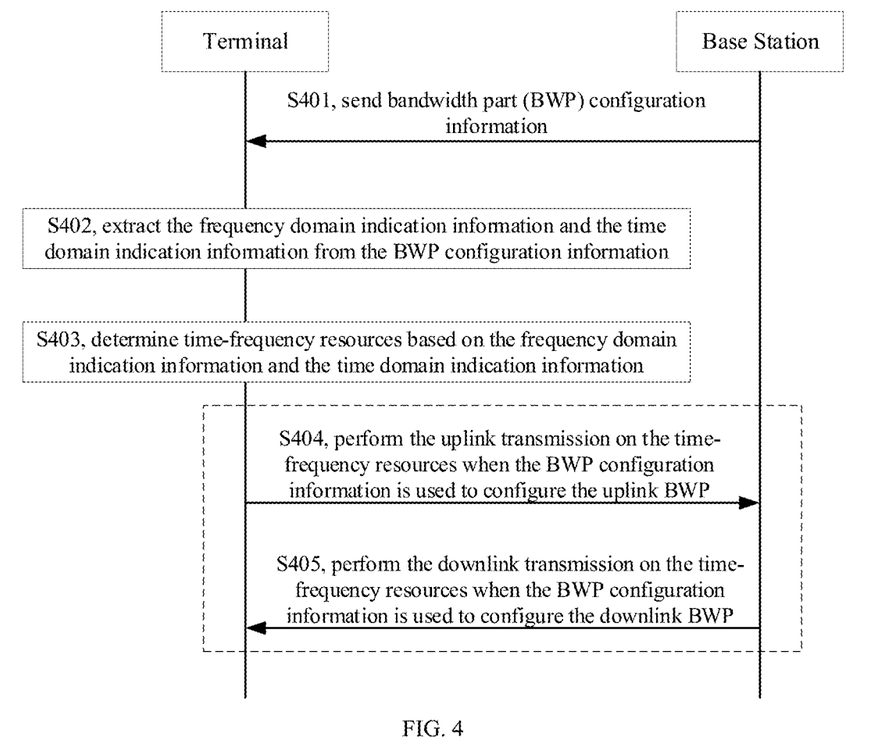
FIG. 4 is a flowchart of a data transmission method provided by examples of the present disclosure.

Please refer to FIG. 4, which illustrates a flowchart of a data transmission method provided by examples of the present disclosure. The data transmission method is applicable to the wireless communication system illustrated in FIG. 1 and performed by the terminal and the base station in FIG. 1. The method may include the following steps.

At step 401, the base station sends bandwidth part (BWP) configuration information to the terminal, and accordingly, the terminal receives the BWP configuration information.

The BWP configuration information includes frequency domain indication information and time domain indication information. The frequency domain indication information indicates a working bandwidth of the terminal. The time domain indication information indicates the time domain resources enabled by the BWP configuration information.

The above-mentioned BWP configuration information may be uplink BWP configuration information or downlink BWP configuration information. In other words, the solutions illustrated in the examples of the present disclosure are applicable to both an uplink BWP configuration and a downlink BWP configuration of the terminal.

In the examples of the present disclosure, the base station configures at least two uplink BWPs and at least two downlink BWPs for the terminal in advance. When the base station determines that the current activated uplink or downlink BWP of the terminal needs to be adjusted according to measurement information or service demand information reported by the terminal, the BWP configuration information may be sent to the terminal to control the terminal to switch the activated uplink or downlink BWP.

In a possible implementation, the above frequency domain indication information includes an identifier of a target bandwidth part. The target bandwidth part is one of at least two bandwidth parts pre-configured for the terminal.

For example, taking a case that the base station configures 4 uplink BWPs and 4 downlink BWPs for the terminal as an example, the 4 uplink BWPs are identified as u1, u2, u3, and u4, and the 4 downlink BWPs are identified as d1, d2, d3, and d4.

In an example, supposing that the current activated uplink BWP of the terminal is the BWP corresponding to u1, when determining that the subsequent uplink data transmitted by the terminal is less and does not require too much uplink bandwidth, which means that the uplink bandwidth can be reduced to save resources, the base station may control the terminal to be switched to an uplink BWP with narrower bandwidth, for example, the uplink BWP corresponding to u3, that is, the base station may send the BWP configuration information including the frequency domain indication information "u3" to the terminal.

Alternatively, in another example, supposing that the current activated downlink BWP of the terminal is the BWP corresponding to d1, when determining that the subsequent downlink data received by the terminal is more and requires wider downlink bandwidth, which means that the downlink bandwidth can be enhanced to improve its transmission speed, the base station may control the terminal to be switched to an downlink BWP with wider bandwidth, for example, the downlink BWP corresponding to d2, that is, the base station may send the BWP configuration information including the frequency domain indication information "d2" to the terminal.

In a possible implementation, the time domain resources indicated by the time domain indication information are non-continuous. Alternatively, the time domain resources indicated by the time domain indication information are continuous.

In the examples of the present disclosure, based on the transmission requirements within a subsequent period of time, the base station may give the time domain indication information to the terminal about the subsequent time domain resources for data transmission.

Figure 5:
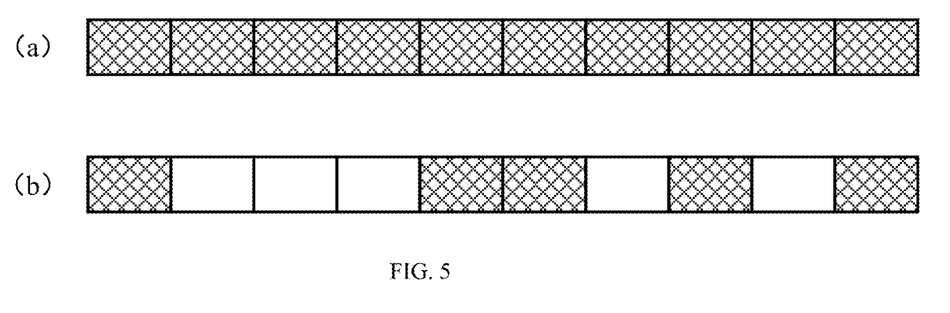
FIG. 5 is a schematic diagram of resource indication involved in the example illustrated in FIG. 4.

For example, please refer to FIG. 5, which illustrates a schematic diagram of resource indication involved in the examples of the present disclosure. In FIG. 5, each filled grid means one PRB. As illustrated in part (a) of FIG. 5, when the subsequent uplink transmission data is more, through the time domain indication information, the subsequent continuous PRBs (10 RRBs illustrated in FIG. 5) may be indicated as the uplink BWP of the terminal by the BWP configuration information sent by the base station. As illustrated in part (b) of FIG. 5, when the subsequent uplink transmission data is less and is distributed at different time, through the time domain indication information, the subsequent non-continuous PRBs (the 1st, 5th, 6th, 8th and 10th PRBs illustrated in FIG. 5) may be indicated as the uplink BWP of the terminal by the BWP configuration information sent by the base station, while the 2nd, 3rd, 4th, 7th and 9th PRBs may be indicated as the downlink BWP of the terminal or as an uplink or downlink BWP of another terminal rather than the current terminal.

In a possible implementation, a minimum time domain unit of the time domain resources indicated by the time domain indication information is an orthogonal frequency division multiplexing (OFDM) symbol.

In the examples illustrated in FIG. 5, the BWP indicated by the base station takes a time slot as its smallest granularity in time domain. Alternatively, the base station may indicate the BWP for the terminal in a smaller unit (e.g., an OFDM symbol), so as to further improve the utilization of system resources.

Figure 6:
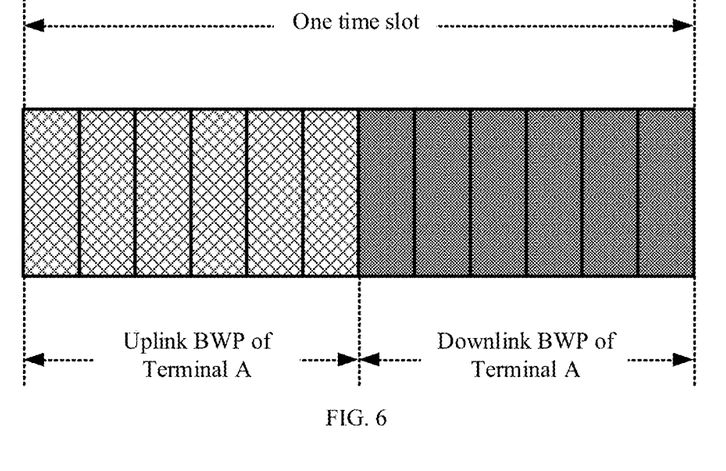
FIG. 6 is a schematic diagram of another resource indication involved in the example illustrated in FIG. 4.

For example, please refer to FIG. 6, which illustrates a schematic diagram of another resource indication involved in the examples of the present disclosure. As illustrated in FIG. 6, for a time slot (which includes 12 OFDM symbols, for example), through the above-mentioned time domain indication information, the base station may indicate the first 6 OFDM symbols as the uplink BWP of terminal A and the last 6 OFDM symbols as the downlink BWP of terminal A. That is, for the time slot that has both uplink symbols and downlink symbols, the time domain information of the BWP can be refined to the OFDM symbols in the examples of the present disclosure.

The time domain information may be expressed as a combination of an offset and a time domain length. The offset may be an offset value from the resources of the BWP in time domain to a time domain end position of the signaling carrying the BWP configuration information, and the time domain length represents a length of the continuous resources behind the corresponding offset.

For example, taking the solution illustrated in FIG. 5 as an example and for the BWP indicated by part (b) in FIG. 5, the time domain indication information in the BWP configuration information sent by the base station may be expressed as (2, 1), (7, 2), (10, 1) and (12, 1) to respectively indicate that the corresponding BWP is apart from the end position of the signaling carrying the BWP configuration information by 2 time slots, 7 time slots, 10 time slots, and 12 time slots, and to respectively indicate that the corresponding time domain lengths are 1 time slot, 2 time slots, 1 time slot, and 1 time slot.

For another example, taking the solution illustrated in FIG. 6 and for the BWP configuration information of the terminal A, the time domain indication information in the BWP configuration information may be expressed as (12, 6) to indicate that the corresponding BWP is apart from the end position of the signaling carrying the BWP configuration information by 12 OFDM symbols and to indicate that the time domain length is 6 OFDM symbols.

In a possible implementation, when sending the BWP configuration information to the terminal, the base station may send the BWP configuration information to the terminal through radio resource control (RRC) signaling, and correspondingly, the terminal receives the BWP configuration information that is sent by the base station through the RRC signaling. Alternatively, the base station may send the BWP configuration information to the terminal through downlink control information (DCI), and accordingly, the terminal may receive the BWP configuration information that is sent by the base station through the DCI.

For example, in an example, when the terminal initially accesses the base station, the base station may send the BWP configuration information to the terminal through the RRC signaling, so as to configure the terminal to perform the data transmission with the base station through an initial BWP.

For another example, in another exemplary solution, upon determining that the terminal's BWP needs to be switched during the data transmission between the terminal and the base station, the base station may send the BWP configuration information to the terminal through the DCI, so as to control the terminal switched to a new BWP for the data transmission.

At step 402, the terminal extracts the frequency domain indication information and the time domain indication information from the BWP configuration information.

In a possible implementation, the time domain indication information is on a first level of the BWP configuration information.

In the examples of the present disclosure, the time domain indication in the BWP configuration information is suitable for various data transmissions between the terminal and the base station through the BWP. Therefore, the time domain indication information in the BWP configuration information may be set on the first level of the BWP configuration information, without a need to configure different time domain indication information for different data individually.

Correspondingly, when extracting the time domain indication information from the BWP configuration information, the terminal may extract the time domain indication information on the first level of the BWP configuration information.

At step 403, the terminal determines time-frequency resources indicated by both the frequency domain indication information and the time domain indication information based on the frequency domain indication information and the time domain indication information extracted from the BWP configuration information.

In the examples of the present disclosure, after extracting the frequency domain indication information (such as an identifier of a target bandwidth part) and the time domain indication information from the BWP configuration information, the terminal may determine a bandwidth part (i.e., the frequency domain resources) of the subsequent work based on the identifier of the target working bandwidth, determine the time slots or OFDM symbols (i.e., the time domain resources) of the subsequent work based on the time domain indication information, and obtain, through combining the frequency domain resources and the time domain resources, a time-frequency resource set on which the subsequent data is transmitted.

At step 404, the uplink transmission between the terminal and the base station is performed on the time-frequency resources indicated by both the frequency domain indication information and the time domain indication information when the BWP configuration information is used to configure the uplink BWP of the terminal.

When the BWP configuration information is used to configure the uplink BWP of the terminal, the terminal transmits uplink data to the base station on the time-frequency resources indicated by both the frequency domain indication information and the time domain indication information; and accordingly, the base station received the uplink data from the terminal on the time-frequency resources.

In the examples of the present disclosure, for the uplink BWP configured by the BWP configuration information, the terminal may subsequently transmit one or more physical uplink shared channels (PUSCHs) and one or more physical uplink control channels (PUCCHs) to the base station on the uplink BWP. Correspondingly, the base station receives the PUSCHs and the PUCCHs from the terminal on the uplink BWP configured by the BWP configuration information.

At step 405, the downlink transmission between the terminal and the base station is performed on the time-frequency resources indicated by both the frequency domain indication information and the time domain indication information when the BWP configuration information is used to configure the downlink BWP of the terminal.

When the BWP configuration information is used to configure the downlink BWP of the terminal, the base station transmits downlink data to the terminal on the time-frequency resources indicated by both the frequency domain indication information and the time domain indication information; and accordingly, the terminal received the downlink data from the base station on the time-frequency resources.

In the examples of the present disclosure, for the downlink BWP configured by the BWP configuration information, the base station may subsequently transmit one or more physical downlink shared channels (PDSCHs), one or more physical downlink control channels (PDCCHs) and one or more channel-state information reference signals (CSI-RSs) to the terminal on the downlink BWP. Correspondingly, the terminal receives the PDSCHs, the PDCCHs and the CSI-RSs from the base station on the downlink BWP.

In view of the above, through the solutions illustrated in the examples of the present disclosure, the BWP configuration information sent by the base station to the terminal includes the time domain indication information, and in subsequent data communication, the base station performs the data transmission with the terminal on the time domain resources indicated by the time domain indication information. Thereby, it achieves that one or more BWPs of the terminal is flexibly configured in time domain through the BWP configuration information, and avoids a lack problem of BWP configuration flexibility due to time domain information of each BWP of the terminal being fixed and being configured continuously in time domain, which improves a utilization of system resources.

The following are apparatus examples of the present disclosure, which can be used to implement the method examples of the present disclosure. For the details that are not disclosed in the apparatus examples of the present disclosure, please refer to the method examples of the present disclosure.

Figure 7:
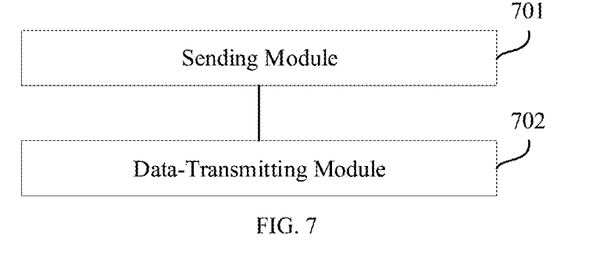
FIG. 7 is a block diagram of a data transmission apparatus provided by examples of the present disclosure.

FIG. 7 is a block diagram of a data transmission apparatus provided by examples of the present disclosure. As illustrated in FIG. 7, the data transmission apparatus may be implemented as all or a part of the base station in the wireless communication system illustrated in FIG. 1 in a form of hardware or in a combination form of software and hardware, so as to perform the steps performed by the base station in any example illustrated in FIG. 2 or FIG. 4. The data transmission apparatus may include:

a sending module 701 that is configured to send bandwidth part (BWP) configuration information to a terminal, wherein the BWP configuration information includes time domain indication information for indicating time domain resources enabled by the BWP configuration information; and a data-transmitting module 702 that is configured to perform a data transmission with the terminal on the time domain resources indicated by the time domain indication information.

In a possible implementation, the data-transmitting module 702 includes:

a first transmitting submodule that is configured to perform the data transmission with the terminal on time-domain resources indicated by both frequency domain indication information and the time domain indication information.

In a possible implementation, the time domain resources indicated by the time domain indication information are non-continuous; or the time domain resources indicated by the time domain indication information are continuous.

In a possible implementation, a minimum time domain unit of the time domain resources indicated by the time domain indication information is an orthogonal frequency division multiplexing (OFDM) symbol.

In a possible implementation, the time domain indication information is on a first level of the BWP configuration information.

In a possible implementation, the frequency domain indication information includes an identifier of a target bandwidth part. The target bandwidth part is one of at least two bandwidth parts pre-configured for the terminal.

In a possible implementation, the sending module 701 includes: a first sending submodule or a second sending submodule.

The first sending submodule is configured to send the BWP configuration information to the terminal through radio resource control (RRC) signaling.

The second sending submodule is configured to send the BWP configuration information to the terminal through downlink control information (DCI).

In a possible implementation, the data-transmitting module 702 includes:
- an uplink-data-receiving submodule that is configured to receive, in response to determining that the BWP configuration information is used to configure an uplink BWP of the terminal, uplink data from the terminal on the time domain resources indicated by the time domain indication information; and
- a downlink-data-transmitting submodule that is configured to transmit, in response to determining that the BWP configuration information is used to configure a downlink BWP of the terminal, downlink data to the terminal on the time domain resources indicated by the time domain indication information.

In view of the above, through the solutions illustrated in the examples of the present disclosure, the BWP configuration information sent by the base station to the terminal includes the time domain indication information, and in subsequent data communication, the base station performs the data transmission with the terminal on the time domain resources indicated by the time domain indication information. Thereby, it achieves that one or more BWPs of the terminal is flexibly configured in time domain through the BWP configuration information, and avoids a lack problem of BWP configuration flexibility due to time domain information of each BWP of the terminal being fixed and being configured continuously in time domain, which improves a utilization of system resources.

Figure 8:
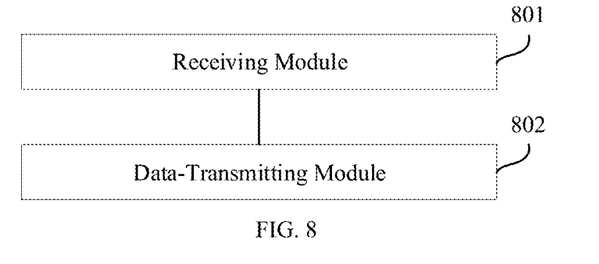
FIG. 8 is a block diagram of a data transmission apparatus provided by examples of the present disclosure.

FIG. 8 is a block diagram of a data transmission apparatus provided by examples of the present disclosure. As illustrated in FIG. 8, the data transmission apparatus may be implemented as all or a part of the terminal in the wireless communication system illustrated in FIG. 1 in a form of hardware or in a combination form of software and hardware, so as to perform the steps performed by the terminal in any example illustrated in FIG. 3 or FIG. 4. The data transmission apparatus may include:
- a receiving module 801 that is configured to receive bandwidth part (BWP) configuration information from a base station, wherein the BWP configuration information includes time domain indication information for indicating time domain resources enabled by the BWP configuration information; and
- a data-transmitting module 802 that is configured to perform a data transmission with the base station on the time domain resources indicated by the time domain indication information.

In a possible implementation, the data-transmitting module 802 includes:
- a second transmitting submodule, configured to perform the data transmission with the base station on time-frequency resources indicated by both frequency domain indication information and the time domain indication information.

In a possible implementation, the time domain resources indicated by the time domain indication information are non-continuous; or the time domain resources indicated by the time domain indication information are continuous.

In a possible implementation, a minimum time domain unit of the time domain resources indicated by the time domain indication information is an orthogonal frequency division multiplexing (OFDM) symbol.

In a possible implementation, the time domain indication information is on a first level of the BWP configuration information.

In a possible implementation, the frequency domain indication information includes an identifier of a target bandwidth part. The target bandwidth part is one of at least two bandwidth parts pre-configured for the terminal.

In a possible implementation, the receiving module 801 includes: a first receiving submodule, or a second receiving submodule.

The first receiving submodule is configured to receive the BWP configuration information that is sent by the base station through radio resource control (RRC) signaling.

The second receiving submodule is configured to receive the BWP configuration information that is sent by the base station through downlink control information (DCI).

In a possible implementation, the data-transmitting module 802 includes:
- an uplink-data-transmitting submodule, configured to transmit, in response to determining that the BWP configuration information is used to configure an uplink BWP of the terminal, uplink data to the base station on the time domain resources indicated by the time domain indication information; and
- a downlink-data-receiving submodule, configured to receive, in response to determining that the BWP configuration information is used to configure a downlink BWP of the terminal, downlink data from the base station on the time domain resources indicated by the time domain indication information.

In view of the above, through the solutions illustrated in the examples of the present disclosure, the BWP configuration information received by the terminal from the base station includes the time domain indication information, and in subsequent data communication, the terminal performs the data transmission with the base station on the time domain resources indicated by the time domain indication information. Thereby, it achieves that one or more BWPs of the terminal is flexibly configured in time domain through the BWP configuration information, and avoids a lack problem of BWP configuration flexibility due to time domain information of each BWP of the terminal being fixed and being configured continuously in time domain, which improves a utilization of system resources.

It should be noted that the division of the above functional modules is only used as an example for illustrating how to realize the functions of each apparatus provided in the above examples. In actual applications, the above functions may be assigned to different functional modules according to actual needs. That is, the internal structure of the apparatus may be divided into different functional modules to complete all or a part of the functions described above.

Regarding the apparatuses in the above examples, the specific ways in which each module performs its operations have been described in detail in the related method examples, and will not be repeated here.

An example of the present disclosure provides a data transmission apparatus that can implement all or a part of the steps performed by the base station in the example illustrated in FIG. 2 or FIG. 4 of the present disclosure. The data transmission apparatus includes: one or more processors and a memory storing instructions executable by the one or more processors.

The one or more processors are configured to:
send bandwidth part (BWP) configuration information to a terminal, wherein the BWP configuration information includes time domain indication information for indicating time domain resources enabled by the BWP configuration information; and
perform a data transmission with the terminal on the time domain resources indicated by the time domain indication information.

In a possible implementation, the BWP configuration information further includes frequency domain indication information for indicating one or more BWPs of the terminal.

And, performing the data transmission with the terminal on the time domain resources indicated by the time domain indication information includes:
performing the data transmission with the terminal on time-frequency resources indicated by both the frequency domain indication information and the time domain indication information.

In a possible implementation, the time domain resources indicated by the time domain indication information are non-continuous; or
the time domain resources indicated by the time domain indication information are continuous.

In a possible implementation, a minimum time domain unit of the time domain resources indicated by the time domain indication information is an orthogonal frequency division multiplexing (OFDM) symbol.

In a possible implementation, the time domain indication information is on a first level of the BWP configuration information.

In a possible implementation, the frequency domain indication information includes an identifier of a target bandwidth part. The target bandwidth part is one of at least two bandwidth parts pre-configured for the terminal.

In a possible implementation, sending the BWP configuration information to the terminal includes:
sending the BWP configuration information to the terminal through radio resource control (RRC) signaling; or
sending the BWP configuration information to the terminal through downlink control information (DCI).

In a possible implementation, performing the data transmission with the terminal on the time domain resources indicated by the time domain indication information includes:
receiving, in response to determining that the BWP configuration information is used to configure an uplink BWP of the terminal, uplink data from the terminal on the time domain resources indicated by the time domain indication information; and
transmitting, in response to determining that the BWP configuration information is used to configure a downlink BWP of the terminal, downlink data to the terminal on the time domain resources indicated by the time domain indication information.

In view of the above, through the solutions illustrated in the examples of the present disclosure, the BWP configuration information sent by the base station to the terminal includes the time domain indication information, and in subsequent data communication, the base station performs the data transmission with the terminal on the time domain resources indicated by the time domain indication information. Thereby, it achieves that one or more BWPs of the terminal is flexibly configured in time domain through the BWP configuration information, and avoids a lack problem of BWP configuration flexibility due to time domain information of each BWP of the terminal being fixed and being configured continuously in time domain, which improves a utilization of system resources.

An example of the present disclosure provides a data transmission apparatus that can implement all or a part of the steps performed by the terminal in the example illustrated in FIG. 3 or FIG. 4 of the present disclosure. The data transmission apparatus includes: one or more processors and a memory storing instructions executable by the one or more processors.

The one or more processors are configured to:
receive bandwidth part (BWP) configuration information from a base station, wherein the BWP configuration information includes time domain indication information for indicating time domain resources enabled by the BWP configuration information; and
perform a data transmission with the base station on the time domain resources indicated by the time domain indication information.

In a possible implementation, the BWP configuration information further includes frequency domain indication information for indicating one or more BWPs of the terminal.

And, performing the data transmission with the base station on the time domain resources indicated by the time domain indication information includes:
performing the data transmission with the base station on time-frequency resources indicated by both the frequency domain indication information and the time domain indication information.

In a possible implementation, the time domain resources indicated by the time domain indication information are non-continuous; or
the time domain resources indicated by the time domain indication information are continuous.

In a possible implementation, a minimum time domain unit of the time domain resources indicated by the time domain indication information is an orthogonal frequency division multiplexing (OFDM) symbol.

In a possible implementation, the time domain indication information is on a first level of the BWP configuration information.

In a possible implementation, the frequency domain indication information includes an identifier of a target bandwidth part. The target bandwidth part is one of at least two bandwidth parts pre-configured for the terminal.

In a possible implementation, receiving the BWP configuration information from the base station includes:
receiving the BWP configuration information that is sent by the base station through radio resource control (RRC) signaling; or
receiving the BWP configuration information that is sent by the base station through downlink control information (DCI).

In a possible implementation, performing the data transmission with the base station on the time domain resources indicated by the time domain indication information includes:
transmitting, in response to determining that the BWP configuration information is used to configure an uplink BWP of the terminal, uplink data to the base station on the time domain resources indicated by the time domain indication information; and
receiving, in response to determining that the BWP configuration information is used to configure a downlink BWP of the terminal, downlink data from the base station on the time domain resources indicated by the time domain indication information.

In view of the above, through the solutions illustrated in the examples of the present disclosure, the BWP configuration information received by the terminal from the base station includes the time domain indication information, and in subsequent data communication, the terminal performs the data transmission with the base station on the time domain resources indicated by the time domain indication information. Thereby, it achieves that one or more BWPs of the terminal is flexibly configured in time domain through the BWP configuration information, and avoids a lack problem of BWP configuration flexibility due to time domain information of each BWP of the terminal being fixed and being configured continuously in time domain, which improves a utilization of system resources.

The foregoing mainly takes terminals and base stations as examples to introduce the solutions provided by the examples of the present disclosure. It can be understood that in order to implement the above-mentioned functions, the terminals and the base stations include hardware structures and/or software modules corresponding respectively to the functions. In combination with the illustrated modules and the illustrated algorithm steps described in the examples of the present disclosure, the examples of the present disclosure can be implemented in a form of hardware or in a combination form of hardware and computer software. It depends on a specific application scenario and design constraints of the technical solution to determine whether a certain function is implemented in the way of hardware or in the way of computer software driving the hardware. Those skilled in the art may use different approaches for different application to implement described functions of each specific application. However, such implementation should not be considered as going beyond the scope of the technical solutions of the examples of the present disclosure.

Figure 9:
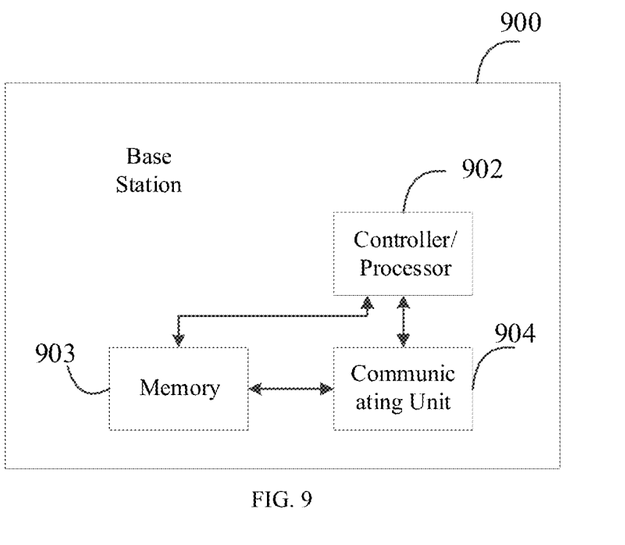
FIG. 9 is a schematic structural diagram of a base station provided by examples of the present disclosure.

FIG. 9 is a schematic structural diagram of a base station provided by examples of the present disclosure. As illustrated in FIG. 9, the base station 900 includes a communicating unit 904 and a processor 902. The processor 902 may be a controller, which is represented as "controller/processor 902" in FIG. 9. The communicating unit 904 is configured to support the base station to communicate with other network devices (such as terminals or other base stations).

Further, the base station 900 may further include a memory 903, and the memory 903 is configured to store program codes and data of the base station 900.

It can be understood that FIG. 9 only illustrates a simplified design of the base station 900. In practical applications, the base station 900 may include any number of processors, controllers, memories, communicating units and the like. All base stations that can implement the examples of the present disclosure are within the protection scope of the examples of the present disclosure.

Figure 10:
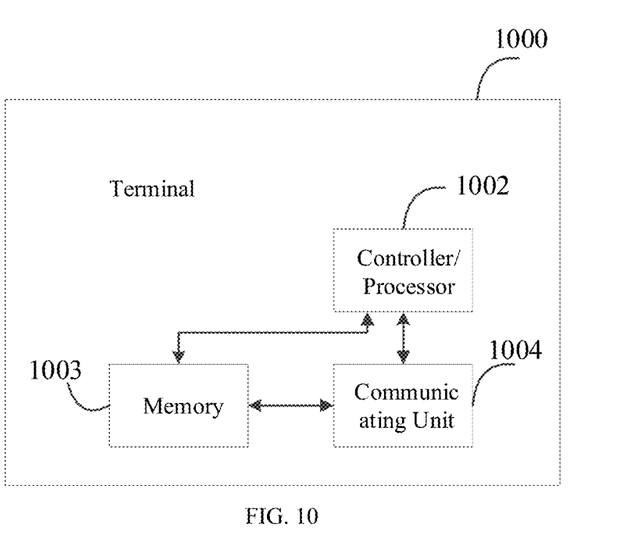
FIG. 10 is a schematic structural diagram of a terminal provided by examples of the present disclosure.

FIG. 10 is a schematic structural diagram of a terminal provided by examples of the present disclosure. As illustrated in FIG. 10, the terminal 1000 includes a communicating unit 1004 and a processor 1002. The processor 1002 may be a controller, which is represented as "controller/processor 1002" in FIG. 10. The communicating unit 1004 is configured to support the terminal to communicate with other network devices (such as base stations).

Further, the terminal 1000 may further include a memory 1003, and the memory 1003 is configured to store program codes and data of the terminal 1000.

It can be understood that FIG. 10 only illustrates a simplified design of the terminal 1000. In practical applications, the terminal 1000 may include any number of processors, controllers, memories, communicating units and the like. All terminals that can implement the examples of the present disclosure are within the protection scope of the examples of the present disclosure.

Those skilled in the art should be aware that the functions described in the one or more forgoing examples of the present disclosure can be implemented in hardware, software, firmware, or any combination thereof. When implemented in software, these functions may be stored in a computer-readable medium or transmitted as one or more instructions or codes of the computer-readable medium. The computer-readable medium includes a computer storage medium and a communication medium. The communication medium includes any medium that facilitates the transmission of a computer program from one place to another. The storage medium may be any available medium that can be accessed by a general-purpose or special-purpose computer.

The solutions provided according to the embodiments of the present disclosure can obtain the following beneficial effects.

BWP configuration information sent by a base station to a terminal includes time domain indication information, and in subsequent data communication, the base station performs a data transmission with the terminal on time domain resources indicated by the time domain indication information. Thereby, it achieves that one or more BWPs of the terminal is flexibly configured in time domain through the BWP configuration information, and avoids a lack problem of BWP configuration flexibility due to time domain information of each BWP of the terminal being fixed and being configured continuously in time domain, which improves a utilization of system resources.

Examples of the present disclosure also provide a computer storage medium and the readable storage medium contains executable instructions. The executable instructions are called and executed by one or more processors in a terminal, so as to implement the data transmission methods performed by the terminal as described in the various forgoing method examples. Alternatively, the executable instructions are called and executed by one or more processors in a base station, so as to implement the data transmission methods performed by the base station as described in the various forgoing method examples.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative.

It should be understood that the present disclosure is not limited to the above described accurate structures illustrated in the drawings, and various modifications and changes can be made without departing from the scope thereof.

The invention claimed is:

1. A data transmission method, comprising:

sending, by a base station, bandwidth part (BWP) configuration information to a terminal, wherein the BWP configuration information comprises time domain indication information for indicating time domain resources enabled by the BWP configuration information, wherein at least part of the time domain resources indicated by the time domain indication information are non-continuous;

receiving, by the base station and in response to determining that the BWP configuration information is used to configure an uplink BWP of the terminal, uplink data from the terminal on the time domain resources indicated by the time domain indication information; and transmitting, by the base station and in response to determining that the BWP configuration information is used to configure a downlink BWP of the terminal, downlink data to the terminal on the time domain resources indicated by the time domain indication information.

2. The method according to claim 1,
wherein the BWP configuration information further comprises frequency domain indication information for indicating one or more BWPs of the terminal; and
wherein the method further comprises:
performing a data transmission with the terminal on time-frequency resources indicated by both the frequency domain indication information and the time domain indication information.

3. The method according to claim 2, wherein the frequency domain indication information comprises an identifier of a target bandwidth part, wherein the target bandwidth part is one of at least two bandwidth parts pre-configured for the terminal.

4. The method according to claim 1, wherein a minimum time domain unit of the time domain resources indicated by the time domain indication information is an orthogonal frequency division multiplexing (OFDM) symbol.

5. The method according to claim 1, wherein the time domain indication information is on a first level of the BWP configuration information.

6. The method according to claim 1, wherein sending the BWP configuration information to the terminal comprises:
sending the BWP configuration information to the terminal through radio resource control (RRC) signaling; or
sending the BWP configuration information to the terminal through downlink control information (DCI).

7. A data transmission apparatus, configured in a base station, comprising:
one or more processors; and
a memory for storing instructions executable by the one or more processors;
wherein the one or more processors are configured to perform the data transmission method according to claim 1.

8. A non-transitory computer-readable storage medium in which executable instructions are contained, wherein the executable instructions are called and executed by one or more processors of a base station to implement the data transmission method according to claim 1.

9. A data transmission method, comprising:
receiving, by a terminal, bandwidth part (BWP) configuration information from a base station, wherein the BWP configuration information comprises time domain indication information for indicating time domain resources enabled by the BWP configuration information, wherein at least part of the time domain resources indicated by the time domain indication information are non-continuous;
transmitting, by the terminal and in response to determining that the BWP configuration information is used to configure an uplink BWP of the terminal, uplink data to the base station on the time domain resources indicated by the time domain indication information; and
receiving, by the terminal and in response to determining that the BWP configuration information is used to configure a downlink BWP of the terminal, downlink data from the base station on the time domain resources indicated by the time domain indication information.

10. The method according to claim 9,
wherein the BWP configuration information further comprises frequency domain indication information for indicating one or more BWPs of the terminal; and
wherein the method further comprises:
performing a data transmission with the base station on time-frequency resources indicated by both the frequency domain indication information and the time domain indication information.

11. The method according to claim 10, wherein the frequency domain indication information comprises an identifier of a target bandwidth part, wherein the target bandwidth part is one of at least two bandwidth parts pre-configured for the terminal.

12. The method according to claim 9, wherein a minimum time domain unit of the time domain resources indicated by the time domain indication information is an orthogonal frequency division multiplexing (OFDM) symbol.

13. The method according to claim 9, wherein the time domain indication information is on a first level of the BWP configuration information.

14. The method according to claim 9, wherein receiving the BWP configuration information from the base station comprises:
receiving the BWP configuration information that is sent by the base station through radio resource control (RRC) signaling; or
receiving the BWP configuration information that is sent by the base station through downlink control information (DCI).

15. A non-transitory computer-readable storage medium in which executable instructions are contained, wherein the executable instructions are called and executed by one or more processors of a terminal to implement the data transmission method according to claim 9.

16. A data transmission apparatus, configured in a terminal, comprising:
one or more processors; and
a memory for storing instructions executable by the one or more processors;
wherein the one or more processors are configured to:
receive bandwidth part (BWP) configuration information from a base station, wherein the BWP configuration information comprises time domain indication information for indicating time domain resources enabled by the BWP configuration information, wherein at least part of the time domain resources indicated by the time domain indication information are non-continuous;
transmit, in response to determining that the BWP configuration information is used to configure an uplink BWP of the terminal, uplink data to the base station on the time domain resources indicated by the time domain indication information; and receive, in response to determining that the BWP configuration information is used to configure a downlink BWP of the terminal, downlink data from the base station on the time domain resources indicated by the time domain indication information.

* * * * *